Dec. 5, 1933.   P. L. DOWNS   1,938,138
FUNNEL
Filed Jan. 26, 1932
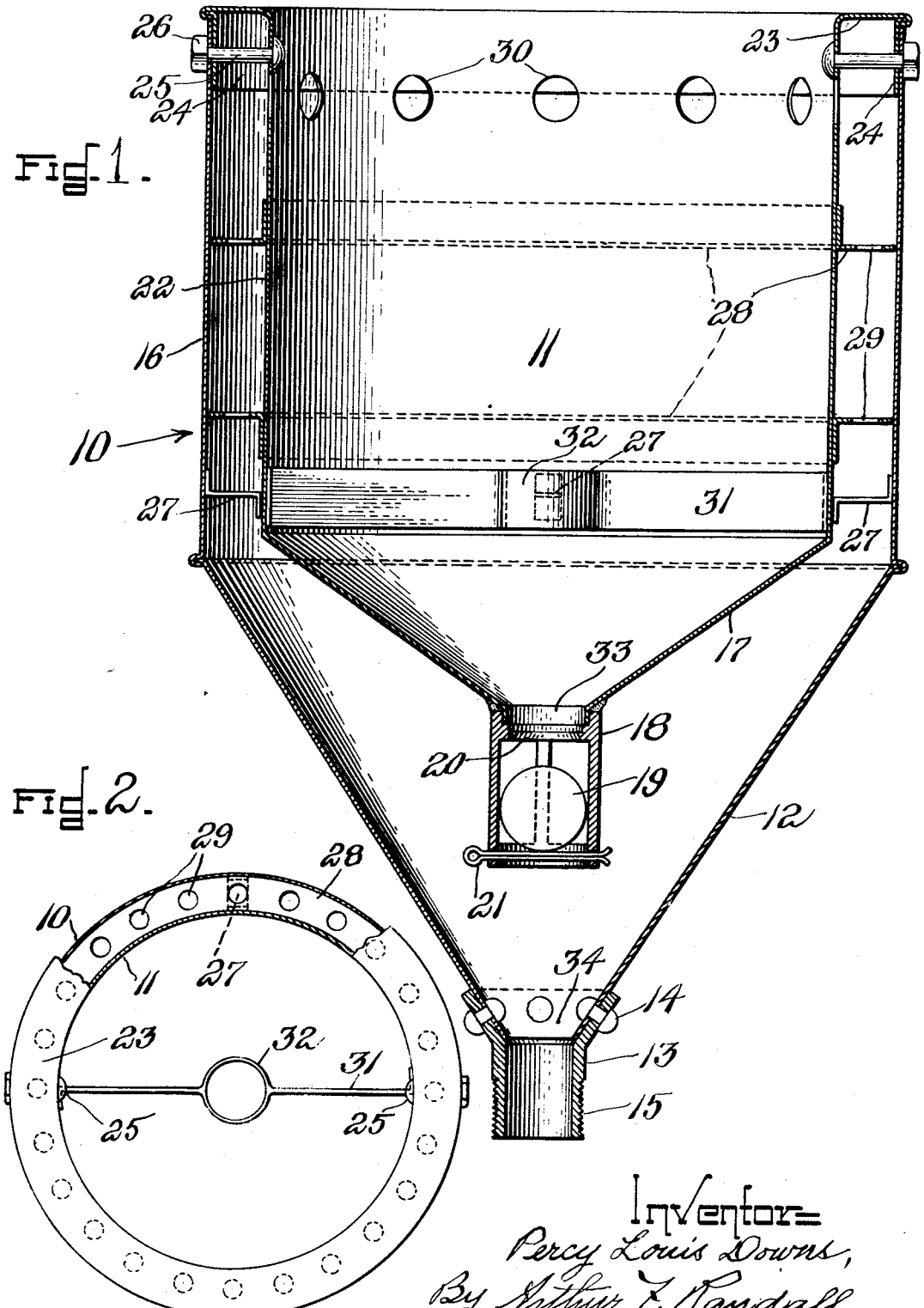
Inventor
Percy Louis Downs,
By Arthur F. Randall
atty.

Patented Dec. 5, 1933

1,938,138

UNITED STATES PATENT OFFICE 1,938,138

FUNNEL

Percy Louis Downs, Wollaston, Mass.

Application January 26, 1932. Serial No. 588,926

5 Claims. (Cl. 226—29)

My invention relates to funnels for use in delivering liquids such as fuel oil into a tank or other container, and it has for its object to provide an improved device of this class.

Tanks and other reservoirs for holding fuel oil, gasolene and the like are, as a matter of safety, usually buried in the ground and it is customary to provide a tank of this kind with a filler pipe and also with a vent pipe, both extending upwardly from the tank to the surface of the ground. The filler pipe is usually provided with a removable closure for its upper end while the vent pipe is open to permit entrance of air into the tank as its contents is withdrawn, and to permit the escape of air when the supply of oil within the tank is replenished.

When replenishing the supply within the tank the closure of the filler pipe is removed and after inserting the delivery end of a funnel within the upper end of the filler pipe, oil is delivered into the funnel, usually by means of a hose but sometimes from portable containers, and flows downwardly through the filler pipe into the tank as the displaced air or vapors pass upwardly through the vent pipe. Vent pipes of the kind referred to are usually made much smaller in capacity than the filler pipe and therefore, when oil was delivered into the funnel at a rate faster than the venting capacity of the vent pipe, the filler pipe would fill up with oil which would overflow through the loose joint between the funnel and pipe and be wasted. It also frequently happened while delivering oil into the funnel too fast that compressed air and oil would be belched upwardly so as to overflow as described and so as to also fill and overflow the funnel.

My invention obviates the objectionable features just referred to which characterize the use of funnels as heretofore constructed and provides an improved funnel having the peculiar features of construction and mode of operation set forth in the following description, the several features of the invention being particularly pointed out and defined in the claims at the close thereof.

In the accompanying drawing:

Figure 1 is a central longitudinal sectional view of a funnel constructed in accordance with my invention.

Figure 2 is a plan view, on reduced scale, of the funnel shown in Fig. 1.

The illustrated embodiment of my invention comprises an outer funnel member 10 within which is provided an inner funnel member 11. The outer funnel member 10 is made with a conical lower section 12 provided at its bottom with an outlet nipple 13 fastened thereto by rivets 14. This outlet nipple 13 is exteriorly threaded as at 15 to adapt it to be screwed into the interiorly threaded upper end of a filler pipe or conduit.

Outer funnel member 10 is also made with an upper section 16 that is cylindrical and permanently connected at its lower end with the lower conical section 12.

The inner funnel member 11 is made with a lower conical section 17 provided at its bottom with an outlet valve fixture 18 that is constructed as on open work cage within which is confined a ball check valve 19 which co-operates with a seat 20 to control the outlet of the section 17. The valve fitting 18 is soldered or otherwise fastened to the section 17 and through its lower end portion extends a pin or bar 21 by which the ball check 19 is confined therein. The upper section 22 of the inner funnel member 11 is cylindrical and centrally disposed with respect to the upper cylindrical section 16 of the outer funnel member. At its top the inner funnel member is provided with an outstanding flange 23 to seat upon the top of the cylindrical portion 16 of the outer funnel member and this flange 23 is made with a depending cylindrical skirt 24 which is removably fitted telescopically into the upper end of the cylindrical section 16 of the outer funnel member as shown in Fig. 1.

The two funnel members are normally locked together in their assembled relationship by means of bolts 25, each of which extends through apertures provided in the section 22 of the inner funnel member, the skirt 24 thereof and the cylindrical section 16 of the outer funnel member. These bolts are equipped with removable nuts 26 so that when desired the two funnel members may be disassembled.

Spot welded or otherwise secured in position upon the inside of the lower portion of the upper cylindrical section 16 of the outer funnel member are a number of radially disposed abutment posts 27 by which the lower portion of the inner funnel member is supported against lateral displacement relatively to the outer funnel section.

Spot welded or otherwise secured in position upon the outside of the cylindrical section 22 of the inner funnel member 11 are two annular baffle plates 28, each of which is formed with a circular series of holes or passageways 29, and above these baffle plates and adjacent to the top of the cylindrical section 22 of the inner funnel member 11, said cylindrical section 22 is made with a circular series of ports or passageways 30 which, as described later, serve as air vents.

Adjacent to the lower end of the cylindrical section 22 of the inner funnel member and within the latter is provided a diametrically disposed cross-bar 31 whose opposite ends are permanently and securely fastened to the inner funnel member by means of spot welding or otherwise. At its middle and coincident with the axis of the funnel, the cross bar 31 is constructed with an eye or ring 32 adapted to receive within it and support the nozzle of a delivery hose.

When the above described funnel is to be used its nipple 15 is screwed into the upper end of the filler pipe leading to the receiving tank or reservoir and then the nozzle of the delivery hose is placed within the eye or ring 32. It will be clear that as the oil discharges from the delivery hose it will be discharged from the inner funnel member through the outlet 33 provided at the lower end thereof into the outer funnel member from which it will discharge through the outlet 34 at the lower end thereof, and the outlet nipple 13, into the filler pipe of the tank.

In the event that oil and air is belched upwardly into the funnel from the filler pipe as often happens, the ball check 19 will be projected upwardly against its seat 20 thereby closing the outlet 33 so that the upwardly projected oil will be trapped and held within the outer funnel member 10, while the air issuing from the filler pipe with such oil will pass upwardly between the two funnel members, and through the ports 29, to the vents 30 through which it will discharge into the atmosphere. It will be clear that the purpose of the baffle plates 28 is to prevent the oil from surging upwardly to the vents 30. As soon as the eruption of oil and air from the filler pipe ceases, the funnel will resume its normal action and the oil from both sections will be delivered into the filler pipe.

During each belching or eruption of oil and air from the filler pipe the threaded engagement between the nipple 13 and the filler pipe provides a closed joint between the funnel and pipe preventing overflow or leakage at this point.

When, for any reason, it is desired to remove the inner funnel member this may be accomplished after removal of the bolts 25. When the bolts 25 are removed the inner funnel member can be lifted out of the other member.

What I claim is:

1. A funnel comprising an outer member having a conical lower portion provided at its bottom with an outlet adapted to be fitted into a receiving conduit; an inner member fixed within and smaller than said outer member so as to provide a space between the two members, said inner member having an outlet at its bottom that is above the outlet of said outer member and said space being vented adjacent to its top; a check valve controlling the outlet of said inner member that is completely inclosed by said outer member and which is closed by upward movement of the fluid within the latter and a horizontal baffle plate within the space between the two members, said plate being disposed below the vented upper portion of said space and above said check valve and above the outlet that is controlled by the latter.

2. A funnel comprising an outer sheet metal member having a cylindrical upper portion and a conical lower portion provided at its bottom with an outlet adapted to be fitted into a receiving conduit; an inner sheet metal member comprising a conical lower portion and a cylindrical upper portion, said cylindrical upper portion being fixed within the cylindrical upper portion of said outer member and being substantially less in diameter than the cylindrical upper portion of the outer member so as to provide an annular space between the two members, said space being vented adjacent to its top, means separably fastening said two members together adjacent to their upper ends; means on one of said members engaging the other member to hold the inner end of the inner member against lateral displacement relatively to said outer member, and a check valve controlling the outlet of said inner member that is closed by upward movement of the fluid within said outer member, said check valve being disposed wholly within said outer member so that it is protected by the latter.

3. A funnel constructed in accordance with claim 2, including an annular apertured baffle member fixed in position between said two cylindrical upper portions below the vented upper portion of said space and above the lower conical portion of said inner member.

4. A funnel constructed in accordance with claim 2 and including also a fixed cross-bar within the cylindrical upper portion of said inner member that is constructed with a ring adapted to serve as a rest for the nozzle of a delivery hose which is held seated therein by gravity with its axis alined with the outlet of said inner member.

5. A funnel constructed in accordance with claim 2 wherein said check valve is a ball and wherein a cage for said ball is provided at the outlet of said inner member, said cage and ball being completely inclosed by said outer member.

PERCY LOUIS DOWNS.